US012779398B2

(12) United States Patent
Schoenhaber et al.

(10) Patent No.: US 12,779,398 B2
(45) Date of Patent: Nov. 3, 2026

(54) EXHAUST GAS PURIFICATION SYSTEM FOR STOICHIOMETRIC-COMBUSTION ENGINES

(71) Applicant: UMICORE AG & CO. KG, Hanau-Wolfgang (DE)

(72) Inventors: Jan Schoenhaber, Darmstadt (DE); Marcus Schmidt, Ginsheim (DE); Franz Dornhaus, Aschaffenburg (DE); Heiko Bansemer, Erzhausen (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 650 days.

(21) Appl. No.: 18/252,630

(22) PCT Filed: Nov. 25, 2021

(86) PCT No.: PCT/EP2021/082911

§ 371 (c)(1),
(2) Date: May 11, 2023

(87) PCT Pub. No.: WO2022/112376

PCT Pub. Date: Jun. 2, 2022

(65) Prior Publication Data

US 2024/0001299 A1 Jan. 4, 2024

(30) Foreign Application Priority Data

Nov. 26, 2020 (DE) ..................... 10 2020 131 366.7

(51) Int. Cl.

| | |
|---|---|
| ***B01D 53/94*** | (2006.01) |
| ***B01J 21/04*** | (2006.01) |
| ***B01J 23/44*** | (2006.01) |
| ***B01J 35/00*** | (2024.01) |
| ***B01J 35/56*** | (2024.01) |
| ***B01J 35/63*** | (2024.01) |
| ***F01N 3/023*** | (2006.01) |
| ***F01N 3/035*** | (2006.01) |
| ***F01N 3/08*** | (2006.01) |
| ***F01N 3/10*** | (2006.01) |
| ***F01N 3/28*** | (2006.01) |
| ***F01N 13/00*** | (2010.01) |

(52) U.S. Cl.

CPC ....... *B01D 53/944* (2013.01); *B01D 53/9445* (2013.01); *B01D 53/9477* (2013.01); *B01J 21/04* (2013.01); *B01J 23/44* (2013.01); *B01J 35/19* (2024.01); *B01J 35/56* (2024.01); *B01J 35/633* (2024.01); *B01J 35/635* (2024.01); *B01J 35/638* (2024.01); *F01N 3/035* (2013.01); *F01N 3/101* (2013.01); *F01N 3/106* (2013.01); *F01N 3/2803* (2013.01); *B01D 2255/1021* (2013.01); *B01D 2255/1023* (2013.01); *B01D 2255/9022* (2013.01); *B01D 2255/908* (2013.01); *B01D 2255/9155* (2013.01); *B01D 2257/404* (2013.01); *B01D 2257/502* (2013.01); *B01D 2257/702* (2013.01); *B01D 2258/014* (2013.01); *F01N 2370/04* (2013.01); *F01N 2510/06* (2013.01)

(58) Field of Classification Search

CPC .............. B01D 53/944; B01D 53/9445; B01D 53/9477; B01J 35/19; B01J 35/633; B01J 35/635; B01J 35/638; B01J 35/56; B01J 21/04; B01J 23/44; F01N 3/035; F01N 3/101; F01N 3/106; F01N 3/2803

See application file for complete search history.

(56) References Cited

U.S. PATENT DOCUMENTS

| | | | |
|---|---|---|---|
| 4,609,563 | A | 9/1986 | Shimrock et al. |
| 6,387,338 | B1 | 5/2002 | Anatoly et al. |
| 6,468,941 | B1 | 10/2002 | Bortun et al. |
| 6,478,874 | B1 | 11/2002 | Rosynsky et al. |
| 6,548,105 | B2 | 4/2003 | Kiessling et al. |
| 6,605,264 | B2 | 8/2003 | Bortun et al. |
| 7,041,622 | B2 | 5/2006 | Nunan |
| 8,640,440 | B2 | 2/2014 | Klingmann et al. |
| 8,663,588 | B2 | 3/2014 | Lindner et al. |
| 9,517,462 | B2 | 12/2016 | Roesch et al. |
| 10,253,667 | B2 | 4/2019 | Yang et al. |
| 10,934,908 | B2 | 3/2021 | Wodausch et al. |
| 11,376,569 | B2 | 7/2022 | Schmitz et al. |
| 2010/0055012 | A1 | 3/2010 | Grisstede et al. |

(Continued)

FOREIGN PATENT DOCUMENTS

| | | | |
|---|---|---|---|
| CN | 107371373 | A | 11/2017 |
| CN | 109070056 | A | 12/2018 |

(Continued)

OTHER PUBLICATIONS

Examination Report mailed Feb. 26, 2025 for European Patent Application No. 21820187.9 (5 pages in German; 5 pages English translation).

Office Action mailed Nov. 20, 2025 for Chinese Patent Application No. 202180079578.9 (6 pages in Chinese; 8 pages English translation; 1 page search report).

International Search Report dated Mar. 14, 2022 for International Patent Application No. PCT/EP2021/082911 (3 pages in German with English translation).

(Continued)

*Primary Examiner* — Yong L Chu

(74) *Attorney, Agent, or Firm* — Smith, Gambrell & Russell, LLP

(57) ABSTRACT

The present invention relates to a stoichiometric-combustion spark-ignition engine comprising a specific exhaust gas system for reducing harmful exhaust gases resulting from the combustion process. The exhaust gas system consists in the through-flow direction of a three-way catalytic converter close to the engine, an oxidation catalyst and a gasoline particulate filter.

10 Claims, No Drawings

(56) References Cited

U.S. PATENT DOCUMENTS

| | | | | |
|---|---|---|---|---|
| 2011/0072783 | A1 | 3/2011 | Hepburn et al. | |
| 2018/0038252 | A1* | 2/2018 | Yang | B01J 23/42 |
| 2019/0105636 | A1* | 4/2019 | Wang | F01N 3/101 |
| 2020/0362741 | A1 | 11/2020 | Chandler et al. | |
| 2020/0368727 | A1* | 11/2020 | Schmitz | F01N 3/28 |

FOREIGN PATENT DOCUMENTS

| | | | |
|---|---|---|---|
| CN | 111683733 | A | 9/2020 |
| DE | B26 101 30 633 | A1 | 1/2003 |
| DE | 10 2014 016 700 | A1 | 5/2006 |
| DE | 10 2016 120 432 | A1 | 4/2018 |
| EP | 0 181 970 | B1 | 8/1990 |
| EP | 1 064 094 | B1 | 9/2002 |
| EP | 1 136 462 | B1 | 8/2004 |
| EP | 1 911 506 | A1 | 4/2008 |
| EP | 2 042 225 | A1 | 4/2009 |
| EP | 2 415 522 | A1 | 2/2012 |
| EP | 2 521 618 | B1 | 8/2013 |
| EP | 2 650 042 | A1 | 10/2013 |
| EP | 2 836 288 | A1 | 2/2015 |
| EP | 2 222 388 | B1 | 8/2017 |
| EP | B27 3 738 663 | A1 | 11/2020 |
| JP | 5378659 | B2 | 12/2013 |
| JP | 2014-205108 | A2 | 10/2014 |
| WO | 99/47260 | A1 | 9/1999 |
| WO | 2005/113126 | A1 | 12/2005 |
| WO | 2008/000449 | A2 | 1/2008 |
| WO | 2008/113445 | A1 | 9/2008 |
| WO | 2010/015573 | A2 | 2/2010 |
| WO | 2011/151711 | A1 | 12/2011 |
| WO | 2013/153081 | A1 | 10/2013 |
| WO | B22 2016/033046 | A1 | 3/2016 |
| WO | B25 2016/154391 | A1 | 9/2016 |
| WO | B23 2018/059968 | A1 | 4/2018 |
| WO | B24 2018/069254 | A1 | 4/2018 |

OTHER PUBLICATIONS

Written Opinion of the International Searching Authority dated Mar. 14, 2022 for International Patent Application No. PCT/EP2021/082911 (6 pages in German).

Examination Report mailed Jun. 28, 2021 for German Patent Application No. 10 2020 131 366.7 (6 pages in German with machine translation).

Heck, R. et al., Catalytic Air Pollution Control—Commercial Technology, Wiley, 2. Auflage 2002, p. 87.

DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German with English machine translation.

DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).

DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).

Translation of the Written Opinion of the International Searching Authority mailed Mar. 14, 2022 for International Patent Application No. PCT/EP2021/082911 (6 Pages).

International Preliminary Report on Patentability mailed May 30, 2023 for International Patent Application No. PCT/EP2021/082911(7 Pages in German; 7 pages English Translation).

Office Action mailed May 6, 2026 for German Patent Application No. 10 2020 131 366.7 (5 pages in German; 5 pages English translation).

* cited by examiner

EXHAUST GAS PURIFICATION SYSTEM FOR STOICHIOMETRIC-COMBUSTION ENGINES

The present invention relates to a stoichiometric-combustion spark-ignition engine comprising a specific exhaust-gas system for reducing harmful exhaust gases resulting from the combustion process. In the flow-through direction, the exhaust-gas system consists of a three-way catalyst close to the engine, an oxidation catalyst and a gasoline particulate filter.

The exhaust gas of internal combustion engines in motor vehicles typically contains the harmful gases carbon monoxide (CO) and hydrocarbons (HC), nitrogen oxides ($NO_x$), and possibly sulfur oxides ($SO_x$), as well as particulates that mostly consist of solid carbon-containing particles and possibly adherent organic agglomerates. These are called primary emissions. CO, HC, and particulates are products of the incomplete combustion of the fuel inside the combustion chamber of the engine. Nitrogen oxides form in the cylinder from nitrogen and oxygen in the intake air when combustion temperatures exceed 1200° C. Sulfur oxides result from the combustion of organic sulfur compounds, small amounts of which are always present in non-synthetic fuels. Compliance in the future with statutory exhaust emission limits for motor vehicles applicable in Europe, China, North America, and India requires the extensive removal of said harmful substances from the exhaust gas. For the removal of these emissions, which are harmful to health and environment, from the exhaust gases of motor vehicles, a variety of catalytic technologies for the purification of exhaust gases have been developed, the fundamental principle of which is usually based upon guiding the exhaust gas that needs purification over a flow-through or wall-flow honeycomb body with a catalytically active coating applied thereto. The catalyst facilitates the chemical reaction of different exhaust gas components, while forming non-hazardous products, such as carbon dioxide, water, and nitrogen.

The flow-through or wall-flow honeycomb bodies just described are also called catalyst supports, carriers, or substrate monoliths, as they carry the catalytically active coating on their surface or in the walls forming this surface. The catalytically active coating is often applied to the catalyst support in the form of a suspension in a so-called coating operation. Many such processes in this sense were published in the past by automotive exhaust-gas catalyst manufacturers (EP106409461, EP252161861, WO10015573A2, EP 113646261, U.S. 64/788,7461, U.S. Pat. No. 4,609,563A, WO9947260A1, JP5378659B2, EP2415522A1, JP2014205108A2).

The operating mode of the internal combustion engine is decisive for the methods of harmful substance conversion possible in the catalyst in each case. Diesel engines are usually operated with excess air, most spark-ignition engines with a stoichiometric mixture of intake air and fuel. "Stoichiometric" means that on average exactly as much air is available for combustion of the fuel present in the cylinder as is required for complete combustion. The combustion air ratio A (A/F ratio; air/fuel ratio) sets the air mass $m_{L,actual}$ which is actually available for combustion in relation to the stoichiometric air mass $m_{L,st}$:

$$\lambda = \frac{m_{L,actual}}{m_{L,st}}$$

If λ<1 (e.g., 0.9), this means "air deficiency" and one speaks of a rich exhaust gas mixture; λ>1 (e.g., 1.1) means "excess air" and the exhaust gas mixture is referred to as lean. The statement λ=1.1 means that 10% more air is present than would be required for the stoichiometric reaction.

When lean-burn motor vehicle engines are mentioned in the present text, reference is thereby made mainly to diesel engines and to predominantly on average lean-burn spark-ignition engines. The latter are gasoline engines predominantly operating on average with a lean NF ratio (air/fuel ratio). In contrast, most gasoline engines are predominantly operated with an on average stoichiometric combustion mixture. In this respect, the expression "on average" takes into consideration the fact that modern gasoline engines are not statically operated with a fixed air/fuel ratio (NF ratio; λ value). It is rather the case that a mixture with a discontinuous course of the air ratio A around λ=1.0 is predetermined by the engine control system, resulting in a periodic change of oxidizing and reducing exhaust gas conditions. This change in the air ratio λ is significant for the exhaust gas purification result. To this end, the λ value of the exhaust gas is regulated with a very short cycle time (approx. 0.5 to 5 Hz) and an amplitude Δλ of 0.005≤Δλ≤0.07 around the value λ=1.0. On average, the exhaust gas under such operating states should therefore be described as "on average" stoichiometric. In order to ensure that these deviations do not adversely affect the result of exhaust gas purification when the exhaust gas flows over the three-way catalyst, the oxygen storage materials contained in the three-way catalyst balance out these deviations by absorbing oxygen from the exhaust gas or releasing it into the exhaust gas as needed (R. Heck et al., Catalytic Air Pollution Control, Commercial Technology, Wiley, 2nd edition 2002, p. 87). However, due to the dynamic mode of operation of the engine in the vehicle, further deviations from this state also occur at times. For example, under extreme acceleration or in overrun operation, the operating states of the engine, and thus of the exhaust gas, can be adjusted and can, on average, be hypostoichiometric or hyperstoichiometric. Therefore, stoichiometric-combustion spark-ignition engines have an exhaust gas which is predominantly, i.e., for the majority of the duration of the combustion operation, combusted with an air/fuel ratio that is stoichiometric on average.

The harmful gases carbon monoxide and hydrocarbons from a lean exhaust gas can easily be rendered harmless by oxidation on a suitable oxidation catalyst. The NO also present in the exhaust gas is oxidized more or less to $NO_2$ under appropriate conditions. The reduction of nitrogen oxides to nitrogen ("denitrification" of the exhaust gas) is difficult on account of the high oxygen content of a lean-burn engine. A known method is selective catalytic reduction (SCR) of the nitrogen oxides in a suitable catalyst or SCR catalyst for short. In a stoichiometrically operated internal combustion engine, all three harmful gases (HC, CO, and $NO_x$) can be eliminated via a three-way catalyst.

Diesel particulate filters (DPF) or gasoline particulate filters (GPF) with and without additional catalytically active coating are suitable aggregates for removing the particulate emissions. In order to meet the legal standards, it is desirable for current and future applications for the exhaust gas aftertreatment of internal combustion engines to combine particulate filters with other catalytically active functionalities not only for reasons of cost but also for installation space reasons. They are frequently associated in the exhaust-gas system with a three-way catalyst possibly located close to the engine.

The use of a particulate filter, whether catalytically coated or not, leads to a noticeable increase in the exhaust-gas back pressure in comparison with a flow-through support of the same dimensions and thus to a reduction in the torque of the engine or possibly to increased fuel consumption. In order not to overly increase the exhaust-gas back pressure, the gasoline particulate filters, in particular uncoated gasoline particulate filters, must be regenerated from time to time even in a of a predominantly on average stoichiometrically operated spark-ignition engine, in order to completely free the filter of soot and restore a more acceptable exhaust-gas back pressure. This active regeneration process requires a special procedure in which the internal combustion engine must initially be trimmed such that a filter located, for example, in the under-floor region of a vehicle, reaches a temperature of 650° C. before a longer lean phase for soot burn-off follows. This procedure results, on the one hand, in an increased $CO_2$ emission and, on the other hand, in a significantly higher thermal load of the three-way catalyst located close to the engine.

Exhaust-gas systems for stoichiometrically operated spark-ignition engines having a catalytically coated or uncoated gasoline particulate filter are known in the art (e.g. EP2836288B1; WO2018059968A1; DE102016120432A1). Methods and systems describing a regeneration of the GPF can be found in the following literature: US20110072783A1; DE102014016700A1; WO2018069254A1. Nevertheless, it was an object to provide further improved systems for the purification of predominantly and, on average, stoichiometric-combustion spark-ignition engines, with which the regeneration of the particulate filter as far as possible takes place without the problems described above.

These and other objects that are obvious from the prior art to a person skilled in the art are achieved by a corresponding internal combustion engine having an associated exhaust-gas system according to independent claim 1. Further preferred embodiments are the subject matter of the dependent claims that are dependent on claim 1. A corresponding method is provided in claim 10.

By using an exhaust-gas system for reducing harmful exhaust gases resulting from fuel combustion in a stoichiometrically operated spark-ignition engine, wherein the exhaust-gas system comprises a three-way catalyst close to the engine and a gasoline particulate filter installed in the under-floor, and by passing the exhaust gas, which arrives from the three-way catalyst close to the engine, through an oxidation catalyst before filtration, said oxidation catalyst being capable of oxidizing NO to $NO_2$ in the presence of excess air, at temperatures of 250° C.-500° C., one can arrive at the solution to the stated object in a simple but not obvious manner.

Due to its stoichiometric operation, the gasoline engine forms mainly nitrogen monoxide (NO). The oxidation catalyst located in the under-floor can oxidize NO to nitrogen dioxide ($NO_2$), for example, during overrun fuel cutoff phases, i.e., when the exhaust-gas composition is lean. Nitrogen dioxide is a much better oxidizing agent compared to oxygen, so that the soot located in the filter can be continuously oxidized passively in the overrun fuel cutoff phases at temperatures around 400-450° C. Therefore, the necessary active regeneration procedure has to be applied much less often or not at all, which reduces the above-described disadvantages or renders them obsolete. If the oxidation catalyst is located on the inlet side of the filter as described below, this coating of the particulate filter with an oxidation catalyst coating surprisingly results in an increased fresh filtration performance of the particulate filter. Especially in the case of new vehicles with direct gasoline injection and turbocharging, this increase is absolutely necessary in order to pass the current type approval test. Remarkably, in one embodiment according to the invention this coating of the particulate filter leads to no measurable increase in the back pressure of the filter, both in the fresh state and after soot loading.

Overrun fuel cutoff is an intended temporary interruption of the fuel supply in an internal combustion engine, if the latter is not to output power, but is towed by the vehicle mass that has gained momentum. In the overrun mode of an internal combustion engine used as a vehicle drive, it is not necessary to add fuel, although air throughput is present, since the movement of the engine is maintained by the rotation imposed via the drive train. An energy supply by the addition of fuel becomes necessary again only just above the idling speed, in order to prevent the engine from stopping or stalling. An overrun fuel cutoff was used first in diesel engines, wherein the fuel injection pump switched off the fuel delivery when the speed controller was active and the engine speed was too high. This usually occurred when the accelerator pedal had not been actuated and the engine was pushed by the vehicle. When it comes to spark-ignition engines, the overrun fuel cutoff has been used in electronic injection systems since 1980. In this case, the fuel supply is switched off by means of the fuel injection valves when an engine speed of approximately 1100-1400/min has been reached (depending on the parameters of engine temperature, speed tendency, and throttle or accelerator pedal position).

The oxidation catalyst used in the present case is adapted specifically to the underlying object. In the presence of excess air, it should be capable of oxidizing NO to $NO_2$ at temperatures of 250° C.-500° C. The higher the $NO_2$ amount in the exhaust gas, the better, because $NO_2$ is known to be better than atmospheric oxygen at oxidizing soot deposited in a downstream soot particulate filter at lower temperatures. Therefore, in order to be able to reach its full potential, the oxidation catalyst should be configured to oxidize NO in the exhaust gas to $NO_2$. Normally, the effect of platinum group metals is used for this purpose. It is therefore preferred if the oxidation catalyst includes these platinum group metals on a temperature-resistant metal oxide with a large surface area.

Platinum and/or palladium are preferably used as platinum group metals in this regard. Platinum has the largest oxidation potential for NO. Nevertheless, it may be that still existing traces of HC and CO are also present. They are generally oxidized better by palladium. It may be therefore expedient if in the oxidation catalyst coating considered in the present case, the weight ratio of Pt:Pd in the oxidation catalyst is 1, preferably >10 and most preferably >20. Furthermore, the coating of the oxidation catalyst can be characterized in that the ratio of platinum to palladium is in the range from 25:1 to 1:1, preferably in the range from 20:1 to 1.5:1 and particularly preferably in the range from 15:1 to 2:1. The use of pure platinum catalysts is likewise preferably possible.

It has also proven favorable to have multilayer oxidation catalyst coatings which, in an upper layer, have only platinum on a temperature-stable metal oxide with a large surface area and, in a lower layer, a mixture of platinum and palladium or only palladium together with an oxygen storage material on a temperature-resistant metal oxide with a large surface area.

Temperature-resistant metal oxides with a large surface area which can be used in the present case are well-known to the person skilled in the art. They are preferably metal oxides selected from the group consisting of silicon dioxide, aluminum dioxide, zeolite, cerium oxide, cerium/zirconium oxide, titanium dioxide, zirconium dioxide, mixed oxides, composite materials and mixtures of the aforementioned. Such materials are in particular metal oxides with a BET surface area of 30 to 250 $m^2/g$, preferably 100 to 200 $m^2/g$ (determined according to DIN 66132—applicable on the filing date). Aluminum oxide, which can be doped with other elements such as Ba, La, Si, is preferred in this connection.

Oxygen storage materials are those which store oxygen in a lean environment from the exhaust gas and can release it again to the exhaust gas when $\lambda<1$. Mixed oxides (solid solutions) of transition metals are generally suitable for this purpose. In this context, cerium oxides or cerium/zirconium oxides possibly doped with rare earth metals such as Y, Pr, La, Nd should be mentioned as possible compounds. In a preferred embodiment, the oxygen storage material does not contain neodymium (see description further back).

The oxidation catalyst must have the platinum group metals in sufficient concentration in order to be able to show the best possible oxidative effect on the nitrogen monoxide. The oxidation catalyst should have a loading with platinum group metals of 0.035-4.0 g/L, preferably 0.05-2.5 g/L and very preferably 0.01-2 g/L. This applies in particular to the sum of platinum and palladium or to the platinum itself, where only platinum is present. The oxidation catalyst may be temperature-controlled in order to be able to provide the optimum oxidation result (see EP2222388B1). The washcoat loading of the oxidation catalyst is typically in the range of 2.5-100 g/L, preferably in the range of 5-50 g/L.

In a further preferred embodiment, the oxidation catalyst is free of oxygen-storing material. It contains, in particular, only doped aluminum oxide, platinum and palladium, as described above. Here, typical dopants of the aluminum oxide are barium, lanthanum and/or silicon, preferably lanthanum and/or silicon. The concentration of the dopants is typically in the range from 2-15% by weight of the aluminum oxide, preferably 3-13% by weight, particularly preferably 4-10% by weight. In a further embodiment according to the invention, the oxidation catalyst is free of rhodium.

The exhaust gas coming from the three-way catalyst close to the engine should be passed through the oxidation catalyst prior to filtering in the gasoline particulate filter in order to be able to ensure oxidation of the nitrogen monoxide for soot combustion. The position of the oxidation catalyst in the exhaust tract is variable and can be adapted to the vehicle geometry. For example, the oxidation catalyst can be placed as a separate component in front of the GPF, if necessary in a separate housing. In one embodiment according to the invention, the oxidation catalyst is therefore located on a flow-through substrate and is located between the three-way catalyst close to the engine and the particulate filter.

A variant in which the oxidation catalyst is formed as a coating on and/or in the gasoline particulate filter is possible and also preferred due to space saving. Here, the oxidation catalyst is located on the porous wall-flow substrate of the particulate filter. In this case, the oxidation catalyst coating can be located either in the surface pores of the porous filter wall on the inlet side (in-wall), on the walls of the filter wall of the inlet channel (on-wall) or both in-wall and on-wall. Preferably, the oxidation catalyst coating is located in the porous filter wall or on the filter wall of the inlet channels of the particulate filter. Furthermore, it is advantageous for the oxidation catalyst coating to extend over at least 50%, better 60% and more or more preferably more than 70% of the filter length, calculated from the filter inlet. As already mentioned further above, the oxidation catalyst is to be designed such that the oxidation function comes to bear first, and only then the filtration function.

In the cases just mentioned, the GPF itself can have one or more catalytically active coatings which contribute to reducing the harmful components of the exhaust gas. It can preferably be located in the walls of the filter and/or the surface of the outlet side of the filter. In principle, all coatings known to the person skilled in the art for the automotive exhaust-gas field are suitable for the present invention. The catalytic coating of the GPF may preferably be selected from the group consisting of three-way catalyst, SCR catalyst, nitrogen oxide storage catalyst, oxidation catalyst that differs from the just described oxidation catalyst, soot-ignition coating. Preferred in this context is the use of a three-way catalyst, an oxidation catalyst and/or the combination of oxidation catalyst and three-way catalyst. The three-way catalyst of the GPF can be constructed like the three-way catalyst close to the engine (explanation further back). As regards the distribution of the platinum group metals in the exhaust-gas system, reference is made to EP2650042A1, which is preferably applied. As regards the individual catalytic activities coming into consideration and their chemical configuration, reference is made to the statements in WO2011151711A1. However, the GPF can also be used uncoated in the present invention.

Surprisingly, it has been found that the greater the average pore volume (Q3 distribution) of the metal oxide, the better the catalytic soot burn-off function of the oxidation catalyst coating. The average pore volume (Q3 distribution) of the metal oxide, in particular of the possibly doped aluminum oxide, of the oxidation catalyst coating is preferably 0.4 ml/g-2 ml/g, particularly preferably ml/g-1.5 ml/g and very particularly preferably 0.85 ml/g-1.25 ml/g (measured according to DIN 66133—latest version on the filing date).

In particular, it is surprisingly advantageous if the average pore volume (Q3 distribution) of the metal oxides used, in particular of the doped aluminum oxide, increases along the exhaust tract. Preferably, therefore, the ratio of the pore volumes of the metal oxide used in the three-way catalyst close to the engine, in particular of the doped aluminum oxide, to that used in the oxidation catalyst is 0.25-1, particularly preferably 0.3-0.89.

The present invention also relates to a method for purifying the exhaust gas of a stoichiometrically operated spark-ignition engine by means of an exhaust-gas system for reducing harmful exhaust gases resulting from fuel combustion, wherein the exhaust-gas system comprises a three-way catalyst close to the engine and a gasoline particulate filter installed in the under-floor, and the exhaust gas, which arrives from the three-way catalyst close to the engine, is passed through an oxidation catalyst before filtration, said oxidation catalyst being capable of oxidizing NO to $NO_2$ in the presence of excess air, at temperatures of 250° C.-500° C. The preferred embodiments for the spark-ignition engine having the exhaust-gas system apply mutatis mutandis also to this method. Preferably, the required excess of oxygen is adjusted in the overrun fuel cutoff phases already discussed further above.

The three-way catalysts (TWC) used here according to the invention are able to simultaneously remove the three pollutant components HC, CO, and NOx from a stoichiometric exhaust-gas mixture ($\lambda=1$ conditions). They can also convert the nitrogen oxides under rich exhaust gas conditions. They contain for the most part platinum group metals, such as Pt, Pd, and Rh, and mixtures thereof, as catalytically active components, with Pd and Rh being particularly preferred.

The catalytically active metals are often deposited with high dispersion on oxides of aluminum, zirconium, and titanium, or mixtures thereof, which have a large surface area and which may be stabilized or doped by additional elements, such as Ba, Si, La, Y, Pr, etc. Three-way catalysts also include oxygen storage materials (for example, Ce/Zr mixed oxides; see below). Preference is given in particular to three-way catalysts which consist of two different layers, wherein the upstream and upper layer preferably contains rhodium and the downstream or lower layer contains palladium. A suitable three-way catalytic coating is described for example in EP181970B1, WO2008113445A1, WO2008000449A2 by the applicant, which are referenced hereby.

As already described further above, oxygen-storing materials have redox properties and can react with oxidizing components, such as oxygen or nitrogen oxides in an oxidizing atmosphere, or with reducing components, such as hydrogen or carbon monoxide, in a reducing atmosphere. The performance of the exhaust gas aftertreatment of an internal combustion engine operating substantially in the stoichiometric range is described in EP1911506A1. In said document, a particulate filter provided with an oxygen storage material is used. Advantageously, such an oxygen-storing material consists of a cerium/zirconium mixed oxide. Additional oxides—of rare earth metals in particular—can be present. Preferred embodiments of the particulate filter according to the invention thus additionally include lanthanum oxide, yttrium oxide, praseodymium oxide and/or neodymium oxide. Particularly preferably, however, neodymium oxide is not used in the present case. Cerium oxide, which can be present as $Ce_2O_3$ as well as $CeO_2$, is used most frequently. In this regard, reference is also made to the disclosure of US6605264BB and US6468941BA.

Additional examples of oxygen-storing materials comprise cerium and praseodymium or corresponding mixed oxides, which may additionally include following components selected from the group of zirconium, neodymium, yttrium, and lanthanum. These oxygen-storing materials are often doped with precious metals, such as Pd, Rh, and/or Pt, whereby the storage capacity and storage characteristics can be modified. As stated, these substances are able to remove oxygen from the exhaust gas in the lean exhaust gas and to release it again under rich exhaust-gas conditions. This prevents the NOx conversion via the TWC from decreasing and NOx breakthroughs from occurring during a short-term deviation of the fuel-air ratio from lambda=1 into lean operation. Furthermore, a filled oxygen storage prevents HC and CO breakthroughs when the exhaust gas temporarily passes into the rich range, since, under rich exhaust gas conditions, the stored oxygen reacts first with the excess HC and CO before a breakthrough occurs. In this case, the oxygen storage serves as a buffer against fluctuations around lambda=1. A half-filled oxygen storage exhibits the best performance in terms of being able to absorb short-term deviations from lambda=1. Lambda sensors are used in order to be able to determine the fill level of the oxygen storage during operation.

The oxygen-storing capacity correlates with the aging state of the entire three-way catalyst. As part of OBD (on-board diagnosis), the determination of the storage capacity serves to detect the current activity, and thus the aging state, of the catalyst. As stated, the oxygen-storing materials described in the publications are advantageously those that permit a change to their oxidation state. Other such storage materials and three-way catalysts are described in WO05113126A1, US6387338BA, US7041622BB, EP2042225A1, for example.

Wall-flow filters are preferably used as GPF substrates. All ceramic materials customary in the prior art can be used as wall-flow monoliths or wall-flow filters. Porous wall-flow filter substrates made of cordierite, silicon carbide, or aluminum titanate are preferably used. These wall-flow filter substrates have inflow and outflow channels, wherein the respective downstream ends of the inflow channels and the upstream ends of the outflow channels are alternately closed off with gas-tight "plugs." In this case, the exhaust gas that is to be purified and that flows through the filter substrate is forced to pass through the porous wall between the inflow channel and outflow channel, which delivers an excellent particulate filtering effect. The filtration property for particulates can be designed by means of the porosity, pore/radii distribution, and thickness of the wall. The porosity of the uncoated wall-flow filters is typically more than 40%, generally from 40% to 75%, particularly from 50% to 70% [measured according to DIN 66133, latest version on the filing date]. The average pore size of the uncoated filters is at least 7 μm, for example from 7 μm to 34 μm, preferably more than 10 μm, in particular more preferably from 10 μm to 25 μm or very preferably from 12 μm to 20 μm [measured according to DIN 66134, latest version on the filing date]. The completed filters with a pore size of typically 10 μm to 20 μm and a porosity of 50% to 65% are particularly preferred.

Insofar as under-floor (uf) is discussed in the text, in connection with the present invention, this relates to a region in the vehicle in which the catalyst is installed at a distance of 0.2-3.5 m, more preferably 0.5-2 m, and especially preferably 0.7-1.5 m after the end of the first catalyst, close to the engine, of the at least 2 catalysts—preferably, below the driver cabin (FIG. 1).

In one preferred embodiment, the washcoat loading of the three-way catalyst close to the engine is coordinated with the loading of the oxidation catalyst. In this case, the amount of catalytic coating of the three-way catalyst close to the engine in g/L exceeds the amount of the catalytic coating of the oxidation catalyst by a factor of 3-40, preferably by a factor of 6-30. In a further preferred embodiment, the catalytic volume of the coated particulate filter is always greater than the volume of the three-way catalyst close to the engine. The TWC to cGPF volume ratio is typically 0.3-0.99, preferably 0.4-0.9 and particularly preferably 0.5-0.8.

What is designated as close to the engine (cc) within the scope of this invention is an arrangement of the catalyst at a distance of less than 120 cm, preferably less than 100 cm, and especially preferably less than 50 cm from the exhaust gas outlet of the cylinder of the engine. The catalyst close to the engine is preferably arranged directly after the merger of the exhaust gas manifold into the exhaust gas tract.

Typical precious metal concentrations for three-way catalysts, in particular three-way catalysts close to the engine, range from 1-12 g/L, preferably 1.5-10 g/L, particularly preferably 2-9 g/L. Typical coating amounts for three-way catalysts are in the range from 50-350 g/L, preferably 100-300 g/L and particularly preferably 150-280 g/L if they are coated on flow-through substrates, and 10-150 g/L, preferably 20-130 g/L and particularly preferably 30-110 g/L when using three-way catalysts in and/or on wall-flow substrates. In a further preferred embodiment, the ratio of the platinum concentration in g/cft of the three-way catalyst close to the engine to the platinum concentration of the oxidation catalyst is in the range from 0-25, preferably in the range from 0-20 and very particularly preferably in the range from 0-15.

The invention is explained in more detail in the following examples.

Example 1 According to the Invention

Stabilized aluminum oxide was suspended in water. The aluminum oxide used has an average pore volume (Q3 distribution) of 1.25 ml/g. The suspension thus obtained was subsequently mixed with a palladium nitrate solution and a platinum nitrate solution under constant stirring. The resulting coating suspension was used directly for coating a commercially available wall-flow filter substrate, the coating being introduced into the porous filter wall on the inlet side over 100% of the substrate length. The total load of this filter amounted to 10 g/L; the total precious metal load amounted to 0.35 g/L with a 1:12 ratio of palladium to platinum. The coated filter thus obtained was dried and then calcined. It is hereinafter referred to as EGPF1.

Example 2 According to the Invention

Stabilized aluminum oxide was suspended in water. The aluminum oxide used has an average pore volume (Q3 distribution) of 1.25 ml/g. The suspension thus obtained was subsequently mixed with a palladium nitrate solution and a platinum nitrate solution under constant stirring. The resulting coating suspension was used directly for coating a commercially available wall-flow filter substrate, the coating being introduced into the porous filter wall on the inlet side over 100% of the substrate length. The total load of this filter amounted to 10 g/L; the total precious metal load amounted to 0.35 g/L with a 1:2 ratio of palladium to platinum. The coated filter thus obtained was dried and then calcined. It is hereinafter referred to as EGPF2.

Comparative Example 1

Stabilized aluminum oxide was suspended in water. The aluminum oxide used has an average mean pore volume (Q3 distribution) of 0.5 ml/g. The suspension thus obtained was subsequently mixed with a palladium nitrate solution and a platinum nitrate solution under constant stirring. The resulting coating suspension was used directly for coating a commercially available wall-flow filter substrate, the coating being introduced into the porous filter wall on the inlet side over 100% of the substrate length. The total load of this filter amounted to 10 g/L; the total precious metal load amounted to 0.35 g/L with a 1:12 ratio of palladium to platinum. The coated filter thus obtained was dried and then calcined. It is hereinafter referred to as VGPF1.

Performance

The resulting filters EGPF1, EGPF2, VGPF2 and an uncoated wall-flow substrate VGPF2 were first loaded with 4 g/L of soot on the engine test bench and then subjected to a soot burn-off test. The burn-off behavior of the filters was investigated at a constant exhaust-gas temperature of 500° C. before the filter and with a lean exhaust-gas composition at lambda=1.1, by calculating the times t50 and t75 after which the exhaust-gas back pressure of the soot-loaded filters decreased by 50 and 75%, respectively. It was found (Table 1) that the filters according to the invention better catalyze the soot oxidation, which is reflected by a faster decrease in the back pressure. In particular, the uncoated filter VGPF2 does not show any soot burn-off at the 500° C. test temperature.

| | t50 | t75 |
|---|---|---|
| EGPF1 | 707 sec | 885 sec |
| EGPF2 | 654 sec | 837 sec |
| VGPF1 | 725 sec | 907 sec |
| VGPF2 (uncoated) | No burn-off | No burn-off |

In a further test, a system according to the invention consisting of a commercially available three-way catalyst close to the engine and an EGPF1 arranged in the under-floor, was tested for particle filtration efficiency against a system not according to the invention consisting of a commercially available three-way catalyst close to the engine and an uncoated VGPF2 arranged in the under-floor, in the WLTP test on a current gasoline engine with direct injection and turbocharging (Table 2). It was found here that after a conditioning test, the system according to the invention has a significantly increased filtration performance than the comparative system.

| | Filtration efficiency of the system according to the invention including EGPF1 [%] | Filtration efficiency of the comparative system including VGPF2 [%] |
|---|---|---|
| WLTP test 2 | 86 | 80 |
| WLTP test 3 | 91 | 80 |
| WLTP test 4 | 93 | 80 |

The invention claimed is:

1. An exhaust-gas system for reducing harmful exhaust gases resulting from fuel combustion in a stoichiometrically operated spark-ignition engine, the exhaust-gas system comprising a three-way catalyst for positioning close to the engine and a gasoline particulate filter for installation in an under-floor, wherein the exhaust gas coming from the three-way catalyst close to the engine is passed through an oxidation catalyst before filtration, said oxidation catalyst being capable of oxidizing NO to $NO_2$ in the presence of excess air, at temperatures of 250° C.-500° C.; and the oxidation catalyst comprises platinum group metals on a temperature-resistant metal oxide with a large surface area, and the metal oxide of the oxidation catalyst has an average pore volume (Q3 distribution) of 0.7 ml/g-2 ml/g.

2. The exhaust-gas system according to claim 1, wherein the Pt:Pd weight ratio in the oxidation catalyst is ≥1.

3. The exhaust-gas system according to claim 2, wherein the oxidation catalyst is designed as a two-layer catalyst in which, in the lower layer, Pd and an oxygen storage material are deposited on the temperature-resistant metal oxide with a large surface area and, in the upper layer, Pt is deposited on the temperature-resistant metal oxide with a large surface area.

4. The exhaust-gas system according to claim 1, wherein the temperature-resistant metal oxide with a large surface area is selected from the group consisting of silicon dioxide, aluminum dioxide, zeolite, cerium oxide, cerium/zirconium oxide, titanium dioxide, zirconium dioxide, mixed oxides, composite materials and mixtures of the aforementioned.

5. The exhaust-gas system according to claim 1, wherein the loading with platinum group metals in the oxidation catalyst is 0.035-4.0 g/L.

6. The exhaust-gas system according to claim 1, wherein the oxidation catalyst is arranged as a separate component before the catalytically coated or uncoated gasoline particulate filter.

7. The spark ignition engine exhaust-gas system according to claim 1, wherein characterized in that the oxidation catalyst is designed as a coating on and/or in the gasoline particulate filter.

8. The exhaust-gas system according to claim 1, wherein the average pore volume (Q3 distribution) of the metal oxides used in the oxidation catalyst increases in the direction of the exhaust-gas flow.

9. The spark ignition engine exhaust-gas system according to claim 1, wherein characterized in that the ratio of the average pore volume (Q3 distribution) of the metal oxide of the three-way catalyst close to the engine to the metal oxide of the oxidation catalyst is 0.25-1.

10. A method for purifying the exhaust gas of a stoichiometrically operated spark-ignition engine by means of an exhaust-gas system for reducing harmful exhaust gases resulting from fuel combustion, wherein the exhaust-gas system comprises a three-way catalyst close to the engine and a gasoline particulate filter installed in the under-floor, comprising passing an exhaust gas coming from the three-way catalyst close to the engine through an oxidation catalyst before filtration, said oxidation catalyst being capable of oxidizing NO to $NO_2$ in the presence of excess air, at temperatures of 250° C.-500° C., wherein the oxidation catalyst comprises platinum group metals on a temperature-resistant metal oxide with a large surface area, and the metal oxide of the oxidation catalyst has an average pore volume (Q3 distribution) of 0.7 ml/g-2 ml/g.

* * * * *